(12) United States Patent
Verdegem (10) Patent No.: US 9,467,022 B2
(45) Date of Patent: Oct. 11, 2016

(54) HYDRAULIC-ELECTRICAL TRANSDUCER, TRANSDUCER ARRANGEMENT AND METHOD FOR DRIVING A TRANSDUCER

(75) Inventor: Louis Verdegem, Peterborough (GB)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 14/110,408

(22) PCT Filed: Apr. 4, 2012

(86) PCT No.: PCT/EP2012/001489
§ 371 (c)(1),
(2), (4) Date: Jan. 22, 2014

(87) PCT Pub. No.: WO2012/136359
PCT Pub. Date: Oct. 11, 2012

(65) Prior Publication Data
US 2014/0138958 A1    May 22, 2014

(30) Foreign Application Priority Data
Apr. 8, 2011  (DE) .................. 10 2011 016 592

(51) Int. Cl.
| | |
|---|---|
| H02K 7/18 | (2006.01) |
| F03D 11/02 | (2006.01) |
| F03B 13/14 | (2006.01) |
| F03D 9/00 | (2016.01) |
| F15B 1/02 | (2006.01) |
| F16H 61/4096 | (2010.01) |
| F16H 61/44 | (2006.01) |

(Continued)

(52) U.S. Cl.
CPC ............. *H02K 7/1853* (2013.01); *F03B 13/14* (2013.01); *F03D 9/001* (2013.01); *F03D 11/02* (2013.01); *F03D 15/00* (2016.05); *F15B 1/024* (2013.01); *F16H 61/4096* (2013.01); *F16H 61/44* (2013.01); *F05B 2260/406* (2013.01); *Y02E 10/38* (2013.01); *Y02E 10/722* (2013.01); *Y02E 60/15* (2013.01); *Y02E 60/17* (2013.01)

(58) Field of Classification Search
CPC ........ F03B 13/14; F03D 11/02; F03D 9/001; F16H 61/44; F16H 61/4096; F15B 1/024; H02K 7/1853; F05B 2260/406; Y02E 60/15; Y02E 60/17; Y02E 60/175; Y02E 10/32; Y02E 10/38; Y02E 10/722; Y02E 10/725
USPC ....................... 290/42, 53; 60/398
See application file for complete search history.

(56) References Cited

U.S. PATENT DOCUMENTS 6,300,698 B1   10/2001 Fargo et al.

FOREIGN PATENT DOCUMENTS

| CN | 202789354 U | * | 3/2013 |
| DE | 10 2007 018 600 A1 | | 10/2008 |

(Continued)

OTHER PUBLICATIONS

International Search Report corresponding to PCT Application No. PCT/EP2012/001489, mailed Jul. 2, 2012 (German and English language document) (7 pages).

*Primary Examiner* — Logan Kraft
(74) *Attorney, Agent, or Firm* — Maginot, Moore & Beck LLP (57) ABSTRACT

A hydraulic-electrical transducer, a transducer arrangement having a plurality of such transducers, and a method for driving a hydraulic-electrical transducer includes driving two adjustable hydraulic machines of each transducer in such a way that a predetermined damping pressure is set in a pressure line of a pump of a PTO (Power Take Off device) depending on the mechanical power which is input into the PTO.

13 Claims, 4 Drawing Sheets

(56) References Cited

FOREIGN PATENT DOCUMENTS

| DE | 10 2007 056 400 A1 | 1/2009 |
| DE | 10 2008 021 111 A1 | 10/2009 |
| DE | 10 2008 021 576 A1 | 11/2009 |
| DE | 10 2009 016 916 A1 | 10/2010 |
| JP | 2002-142498 A | 5/2002 |
| WO | 2011/011682 A2 | 1/2011 |

* cited by examiner

FIG.7

HYDRAULIC-ELECTRICAL TRANSDUCER, TRANSDUCER ARRANGEMENT AND METHOD FOR DRIVING A TRANSDUCER

This application is a 35 U.S.C. §371 National Stage Application of PCT/EP2012/001489, filed on Apr. 4, 2012, which claims the benefit of priority to Serial No. DE 10 2011 016 592.4, filed on Apr. 8, 2011 in Germany, the disclosures of which are incorporated herein by reference in their entirety.

BACKGROUND

The disclosure relates to a hydroelectric converter having the features of the disclosure, to a converter arrangement having a converter of this type, and to a method for actuating a converter of this type.

Converters of this type are used, for example, in wave power plants, as are described in U.S. Pat. No. 6,300,698. Said known wave power plant has a hydraulic cylinder which is operatively connected to a buoy, with the result that the hydraulic cylinder is actuated by the swell and the corresponding movement of the buoy and therefore, as pump, conveys pressure medium into a hydraulic circuit, with the result that a downstream hydraulic accumulator and a hydraulic machine can be charged and driven, respectively. An output shaft of said hydraulic machine is connected to a generator, with the result that the hydraulic energy is converted into electrical energy. Since the swell varies greatly both with regard to the wave height and the frequency, a complicated electronic circuit has to be provided in order to homogenize the generator output voltage.

DE 10 2007 018 600 A1 proposes an improved converter, in which the hydraulic machine is configured with an adjustable delivery/displacement volume and is operated with speed regulation, in order to homogenize said fluctuations in the wave movement which result in corresponding fluctuations of the tapped-off electrical power.

DE 10 2008 021 576 A1 by the applicant discloses a corresponding converter, in which the oscillating body (buoy) is assigned a braking device in order to avoid excessive mechanical loading, with the result that the oscillating body can be braked if a predefined acceleration, frequency or speed is exceeded.

DE 10 2007 056 400 discloses a converter, in which the hydraulic machine can be adjusted in such a way that the piston of the hydraulic cylinder which acts as pump is loaded with a predefined damping force and a predefined pressure difference. The hydraulic accumulator is also charged by the pump in this solution.

In the above-described prior art, the converter is part of a wave power plant, but the disclosure is in no way restricted to applications of this type. In principle, a converter of this type can also be used in other systems which are preferably driven by a natural force. For instance, the pump can also be driven via a wind turbine, a tidal range or the like.

The common problem of all the abovementioned converters is that, on account of the stated inhomogeneities of the wave movements or the wind which drives the wind power plant, the electrical power which can be tapped off at the generator correspondingly also fluctuates, with the result that a largely homogeneous power tap-off can be realized only with considerable complexity in terms of control technology.

A further problem of converters of this type which are configured with a hydraulic accumulator consists in that the charging of the hydraulic accumulator is possible only when the pressure which is generated by the pump is higher than the pressure in the hydraulic accumulator. In said systems, the maximum pressure of the hydraulic accumulator also limits the system pressure, with the result that a complete conversion of the energy which is stored in the driving medium (wave energy, wind energy, etc.) into electrical energy is not possible. This problem is reinforced further by the fact that, on account of the comparatively limited hydraulic accumulator pressure, hydraulic damping of the pump which is driven by the wave energy or the wind energy is possible only to a restricted extent.

In principle, there is also the possibility, instead of a converter which is configured with a hydraulic accumulator, to couple the pump which is driven by the wave energy or the wind energy directly to an adjustable hydraulic machine which for its part drives a generator, or to couple the generator directly to the oscillating body. A system of this type is known, for example, from the "Wave-Swing" project. It is disadvantageous in directly coupled systems of this type that the power tap-off likewise fluctuates depending on the fluctuations of the natural force (wave energy, wind energy, etc.) and flywheels or the like have to be used in order to store the energy in the event of an energy excess, which flywheels or the like in turn require a considerable amount of installation space and, moreover, increase the complexity in terms of device technology.

The kinetic energy which is tapped off via a PTO (power take-off device) of this type is in principle the product of a damping force on the movement of the PTO and the movement speed. In order to obtain an optimum power tap-off, the damping force and the movement speed have to be varied and reversed during the wave cycle, in order to carry out an optimum adaptation to the respective movement speed of the float or the like. Accordingly, in converters of this type, the damping force and the movement speed have to be regulated, in order to make the optimum power tap-off possible. In wave power plants, said power tap-off accordingly varies twice during each wave cycle between the maximum values at the wave peak and at the swell and the two zero crossings which lie between them.

In contrast, the disclosure is based on the object of providing a hydroelectric converter, a converter arrangement having a converter of this type, and a method for actuating a converter of this type, which make homogenized power tap-off possible even in the case of fluctuations in the input power or energy.

SUMMARY

This object is achieved by the combination of features the hydroelectric converter, by the combination of features of the converter arrangement, and by the combination of features of the method for actuation the hydroelectric converter.

Advantageous developments of the disclosure are the subject matter of the subclaims.

The hydroelectric converter according to the disclosure has a unit, which is preferably driven by a natural force, with a pump, called PTO (power take-off) in the following text. Said PTO is assigned a hydraulic accumulator unit which is operatively connected to a hydraulic machine which drives an electric machine, preferably a generator. According to the disclosure, a second hydraulic machine is provided, via which the electric machine can likewise be driven, it being possible for the delivery/displacement volume of the two hydraulic machines to be adjusted in order to homogenize the tapped-off electrical power. In the converter according to the disclosure, as a result of this adjustment of the two hydraulic machines, a damping pressure which acts on the pump is set in such a way that fluctuations of the natural force which drives the pump can be homogenized. As a result of suitable actuation of the two hydraulic machines, furthermore, the pressure medium flow from and to the hydraulic accumulator can be regulated in order to homogenize the tapped-off electrical power.

The adjustable hydraulic machines are preferably configured in such a way that they can be operated in four-quadrant mode with a constant rotational direction and rotational speed of their output shaft.

By way of a connection of this type, it is possible, for example, that the second hydraulic machine is operated as a motor when the torque which is supplied by the first hydraulic machine is not sufficient to load the generator with a predefined torque. However, the second hydraulic machine can also be operated as a pump when a torque excess is provided via the first hydraulic machine, with the result that charging of the hydraulic accumulator takes place via the second hydraulic machine. Said hydraulic accumulator can then be discharged at a later instant in order to drive the generator.

The converter arrangement according to the disclosure has a plurality of converters of this type, said converters being assigned a common hydraulic accumulator unit.

In the method according to the disclosure for actuating the hydroelectric converter, the delivery/displacement volume of the two hydraulic machines is set depending on the pressure medium volumetric flow from or to the pump, the pressure medium volumetric flow from or to the hydraulic accumulator unit, the pressure medium volumetric flow from or to a tank, the outlet pressure of the pump, the pressure of the hydraulic accumulator unit, the tank pressure, the rotational speeds of the hydraulic motors and the electric machine (generator), or the torques at the hydraulic machines and at the generator.

In one exemplary embodiment of the converter, the two hydraulic machines are connected in series, the second hydraulic machine being arranged upstream of the first machine and the hydraulic accumulator unit being loaded with the pressure between the first and the second hydraulic machine.

According to the disclosure, a low pressure connection of the first hydraulic machine can be connected to a tank or to low pressure.

In one exemplary embodiment of the disclosure, a further PTO can be provided which is assigned a third hydraulic machine which is likewise operatively connected to the electric machine. Said third hydraulic machine is preferably connected hydraulically in parallel to the second hydraulic machine, the first hydraulic machine being assigned both to the second hydraulic machine and to the third hydraulic machine and therefore being connected in each case in series with respect to the latter.

In one variant of the disclosure, the hydraulic accumulator unit can be assigned an electric additional unit with an additional generator and an additional hydraulic machine which can be driven via the hydraulic accumulator unit independently of the hydraulic machines which are described at the outset.

At least the second hydraulic machine can be arranged in an open or closed hydraulic circuit.

In the case of a closed circuit, a charge pump can be provided in order to compensate for leaks.

As mentioned, the PTO can be wave-driven, wind-driven or can be driven by any other renewable energy.

The hydraulic accumulator unit can comprise a plurality of hydraulic accumulators which are connected in parallel (hydraulic accumulator bank).

In the method for actuating a hydroelectric converter, the setting of the delivery/displacement volume of the hydraulic machines can take place in such a way that first of all a current pressure medium volumetric flow at the outlet of the pump is determined. Depending on said output value of the PTO, the delivery/displacement volume of the first hydraulic machine is then calculated and, therefrom, the corresponding instantaneous damping pressure is determined which has to be set at the outlet of the pump of the PTO. Moreover, the pressure in the hydraulic accumulator unit is determined and the torque of the first hydraulic unit is determined from the pressure difference between the previously determined damping pressure and a tank pressure of the system and of the determined delivery/displacement volume of the first hydraulic machine. The delivery/displacement volume of the second hydraulic machine is then set from the desired power output of the electric machine and the previously calculated torque of the first hydraulic machine, in such a way that the desired torque and therefore the desired power output are set at the electric machine. This algorithm is repeated continuously, with the result that electrical power which is largely as constant as possible can be tapped off at the electric machine even in the case of greatly fluctuating kinetic energy which is introduced into the PTO.

DETAILED DESCRIPTION

Figure 1:
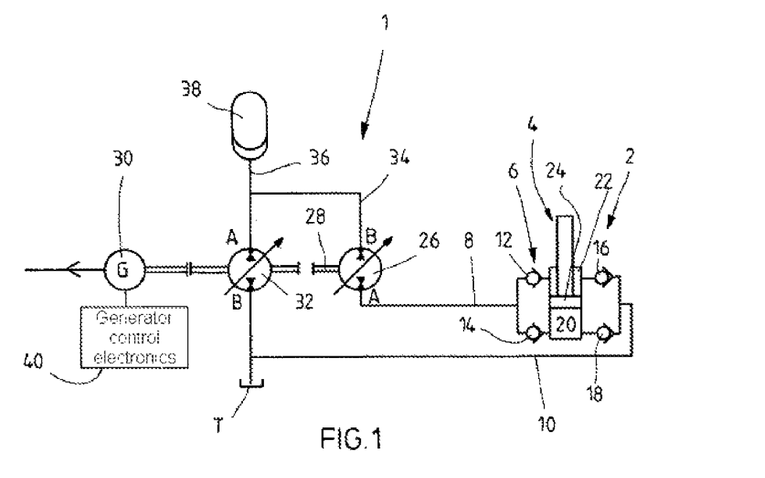
FIG. 1 shows a circuit diagram of a first exemplary embodiment of a hydroelectric converter.

FIG. 1 shows a greatly simplified circuit diagram of a first exemplary embodiment of a converter 1 according to the disclosure, via which kinetic energy, for example wave energy, tidal range or wind energy, is converted into electrical energy. In order to simplify the description, components which are not essential to the disclosure, such as sensors for detecting pressures, volumetric flows, torques, rotational speeds, hydraulic regulating/control elements and control oil pumps, etc., are omitted and only the components which are essential to the disclosure are shown.

As has already been mentioned at the outset, a wave power plant has, for example, a PTO 2 with a float (buoy; not shown in FIG. 1) which carries out an oscillating movement as a result of the swell, which oscillating movement is transmitted via transmission means (not shown) to a pump 4 which is configured as a differential cylinder in the exemplary embodiment according to FIG. 1. As explained in document DE 10 2009 016 916 A1, the PTO 2 can also be configured as what is known as a wave plate which is pivoted by the wave movement.

In a converter for a wind power plant, as will be explained in greater detail in the following text, the PTO 2 would be configured with a wind turbine which correspondingly drives the pump.

The pressure spaces of the hydraulic cylinder (pump 4) according to FIG. 1 are connected via a hydraulic rectifier 6 firstly to a pressure line 8 and a tank line 10. The latter opens into a tank T. In the exemplary embodiment which is shown, the hydraulic rectifier is configured by way of a nonreturn valve arrangement with four nonreturn valves 12, 14, 16, 18, a bottom-side pressure space 20 of the hydraulic cylinder being connected via the nonreturn valves 14, 18 and an annular space 22 of the hydraulic cylinder being connected via the two other nonreturn valves 12, to the pressure line 8 and the tank line 10, respectively. Said nonreturn valves 12, 14, 16, 18 in each case shut off the pressure medium flow from the pressure line 8 or the tank line 10 in the direction of the associated pressure spaces 20, 22. As a result of said nonreturn valve arrangement, pressure medium is therefore conveyed into the pressure line 8 and sucked out of the pressure line 10 independently of the movement direction of a piston 24 of the hydraulic cylinder.

The pressure line 8 is connected to a connection A of a hydraulic machine which will be called second or upstream hydraulic machine 26 in the following text. Said hydraulic machine can be configured, for example, as a radial or axial piston machine and can be operated in four-quadrant mode with torque and rotational speed reversal. An output shaft 28 of the second hydraulic machine 26 drives an electric machine which will be called generator 30 in the following text. A first hydraulic machine 32, the design of which can correspond to that of the second hydraulic machine 26, is coupled indirectly or directly to the output shaft 28. That is to say, the first hydraulic machine 32 also permits a reversal of the rotational direction and the torque. An inlet connection A of the first hydraulic machine 32 is connected via an inflow line 34 to the outlet connection B of the second hydraulic machine 26. An accumulator line 36 which leads to a hydraulic accumulator unit 38 branches off from the inflow line 34. Said hydraulic accumulator unit 38 can be configured from a plurality of hydraulic accumulators which are connected in parallel and can be configured, for example, as gas pressure accumulators or as spring accumulators.

A low-pressure connection B of the first hydraulic machine 32 is likewise connected to the tank line 10.

As will be described in yet further detail in the following text, the delivery/displacement volumes of the two hydraulic machines 26, 32 are adjusted via a control unit 40 in such a way that the above-described fluctuating electrical power which follows the wave form is not tapped off at the generator 30, but rather a homogeneous power tap-off takes place, this taking place by way of setting of the damping force in the pressure line 8 and therefore the movement speed of the PTO 2.

This control operation according to the disclosure will be explained in the following text. In a first method step, the current pressure medium volumetric flow FlowW which is generated in the pressure line 8 by the pump 4 of the PTO 2 is determined to or from the pump 4. Said current volumetric flow FlowW can either be measured or can be predetermined via algorithms from the movement of the PTO.

In a following step, the delivery/displacement volume of the first hydraulic machine 32 is determined according to formula 1, $$\mathrm{Disp1} = \mathrm{FlowW} \times 1000 / \mathrm{Speed} \qquad \text{formula 1}$$

where Disp1 is the delivery/displacement volume of the hydraulic machine 32 in cm$^3$ per revolution and Speed is the rotational speed of the output shaft 28 in revolutions per minute.

In a third step, the required damping force Press1 is determined from predefined algorithms.

Furthermore, the pressure in the hydraulic accumulator unit 38 is determined and the torque Torque1 which is to be applied by the first hydraulic machine 32 is then calculated according to the following formula.

$$\mathrm{Torque1} = \mathrm{Disp1} \times (\mathrm{Press1} - \mathrm{Press2}) / (20 \times \pi) \qquad \text{formula 2}$$

The desired power tap-off of the system determines the torque TorqueGen which acts on the generator 30 calculated according to the formula $$\mathrm{Power\ Output} = 2 \times \pi \times \mathrm{TorqueGen} \times \mathrm{Speed} / 60\,000 \qquad \text{formula 3,}$$

where "Power Output" is the power tap-off at the generator 30.

In order to achieve said power tap-off, the delivery or displacement volume of the second hydraulic machine 26 is set in such a way that the sum of the torques which are introduced via the two hydraulic machines 32, 26 add up to the desired torque at the generator 30. This torque equilibrium is given by the formula $$\mathrm{TorqueGen} = \mathrm{Torque1} + \mathrm{Torque2} \qquad \text{formula 4,}$$

where Torque2 is calculated according to the following formula:

$$\mathrm{Torque2} = \mathrm{Disp2} \times (\mathrm{Press2} - \mathrm{Press}T) / (20 \times \pi) \qquad \text{formula 5.}$$

Here, Press2 stands for the pressure in the hydraulic accumulator unit 38 and PressT stands for the tank pressure which can lie, for example, in the range from 4 to 5 bar.

In a following regulating step, the pressure medium volumetric flow via the second hydraulic machine 26 is then determined via the equation $$\mathrm{Flow}B = \mathrm{Disp2} \times \mathrm{Speed} / 1000 \qquad \text{formula 6}$$

and finally the net volumetric flow into the hydraulic accumulator unit 38 or out of the hydraulic accumulator unit and therefore the charge state of the hydraulic accumulator unit 38 are determined according to the equation $$\mathrm{Flow}A = \mathrm{FlowW} - \mathrm{Flow}B \qquad \text{formula 7.}$$

In this way, the kinetic energy of the PTO which fluctuates depending on the wave movement or another natural force can be converted into a substantially constant electrical power output which is tapped off at the generator 30.

Figure 2:
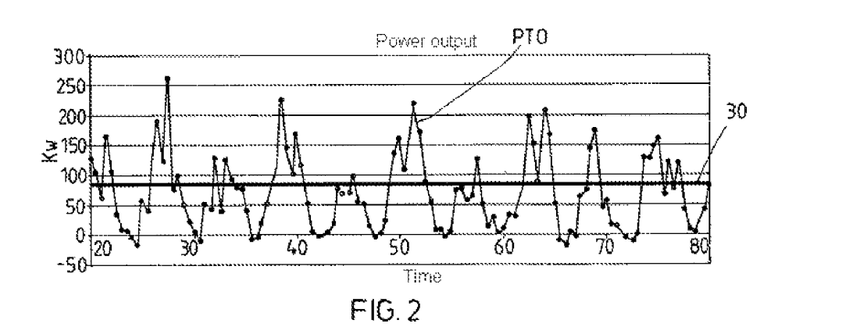
FIG. 2 shows a diagram to illustrate the kinetic energy which is introduced via the PTO and the homogenized electrical power which is tapped off at an electric machine.

This will be explained using FIG. 2. Said figure shows a diagram, in which the kinetic input power which is fed from the PTO 2 to the converter 1 is compared with the electrical power which is tapped off at the generator 30. It can be seen that the power which is introduced via the PTO 2 fluctuates relatively greatly in accordance with the wave movement despite the rectifier 6, but the power which is tapped off at the generator 30 remains substantially constant, the charge state of the hydraulic accumulator unit 38 being coordinated in each case in an optimum manner with the power which is introduced into the system. In the above-described regulating strategy, the pressure Press2 in the hydraulic accumulator unit 38 and therefore also the pressure difference across the hydraulic machine 32 therefore vary depending on the input power which is introduced at the PTO.

Figure 3:
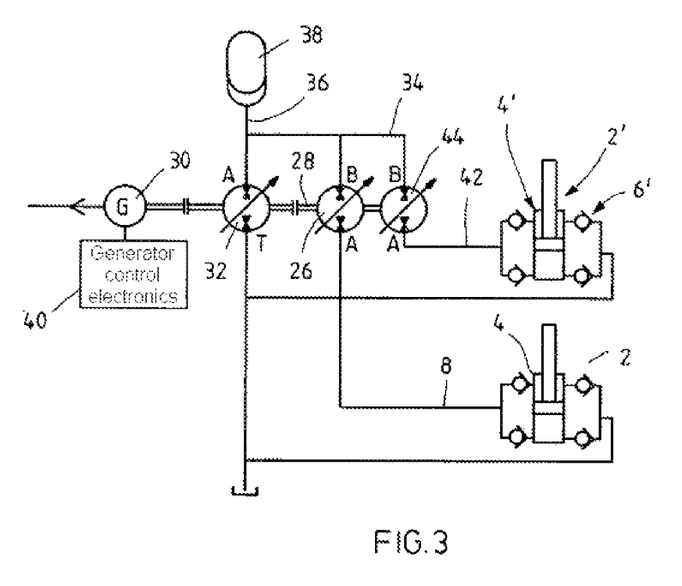
FIG. 3 shows one exemplary embodiment of a converter with two PTOs.

FIG. 3 shows one variant of the exemplary embodiment according to FIG. 1, two PTOs 2, 2' being connected in parallel. According to FIG. 1, each of said PTOs 2, 2' is configured with a pump 4 and 4', respectively. The connection of the pump 4 to the two hydraulic machines 26, 32 of the hydraulic accumulator unit 38 and to the generator 30 corresponds to the exemplary embodiment according to FIG. 1, with the result that reference is made in this regard to the above comments.

The pump 4' of the further PTO 2' is once again configured as a hydraulic cylinder with a hydraulic rectifier 6 in the above-described design. The pressure side of the hydraulic pump 4' is connected via a further pressure line 42 to an inlet connection A of a third hydraulic machine 44 which is likewise operatively connected to the output shaft 28 and therefore contributes a torque proportion. A connection B of the third hydraulic machine 44 is connected to the inflow line 34, with the result that a pressure medium connection of the connection B of the third hydraulic machine 44 exists to the connection B of the second hydraulic machine 26 and to the hydraulic accumulator unit 38 and the connection A of the first hydraulic machine 32.

Accordingly, the first hydraulic machine 32 and the hydraulic accumulator unit 38 and the generator 30 are assigned to both PTOs 2, 2'. The control of the damping force in the pressure lines 8, 42 and of the movement speeds of the PTOs takes place according to the above-described regulating algorithm.

Figure 4:
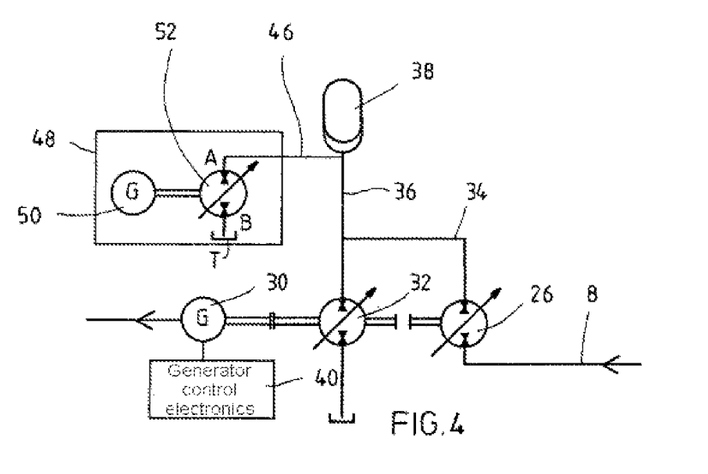
FIG. 4 shows one exemplary embodiment of a converter with an additional generator/hydraulic machine unit.

FIG. 4 shows one variant of the exemplary embodiment according to FIG. 1, an accumulator branch line 46 which supplies a further motor/generator unit 48 with pressure medium branching off from the accumulator line 36. Said motor/generator unit 48 comprises in principle an additional generator 50 and an additional hydraulic machine 52 which is connected via a connection A to the accumulator branch line 46 and via a connection B to the tank T. The construction of the additional generator 50 and the additional hydraulic machine 52 can correspond to the corresponding components of the above-described exemplary embodiments.

Said additional motor/generator unit 48 is then actuated via the control unit 40 when the power which is introduced via the PTO 2 exceeds the power which is tapped off at the generator 30 and the hydraulic accumulator unit 38 is charged accordingly. In the above-described exemplary embodiments, at least the pump 4, 4' and the associated hydraulic machine 26, 44 are operated in an open hydraulic circuit.

Figure 5:
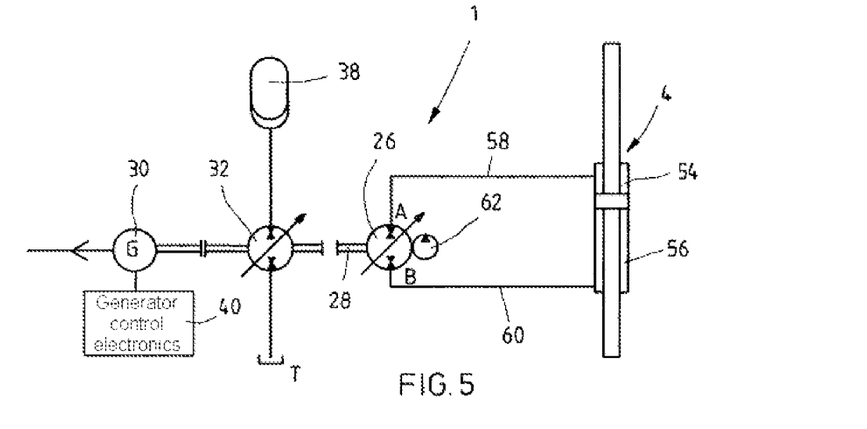
FIG. 5 shows one exemplary embodiment of a converter with a closed hydraulic circuit.

FIG. 5 shows one exemplary embodiment, in which the pump 4 and the second hydraulic machine 26 are operated in a closed hydraulic circuit which is shown in an extremely simplified form in the diagram according to FIG. 5. In the exemplary embodiment which is shown, the pump 4 is configured as a synchronous cylinder, the pressure spaces 54, 56 of which, which are configured with an identical cross section, are connected via a hydraulic rectifier (not shown) and working lines 58, to the connections A, B of the second hydraulic machine 26, with the result that the damping force which acts on the PTO 2 can be set in the above-described way by corresponding setting of the pivot angles of the two hydraulic machines 26, 32. In the exemplary embodiment which is shown in FIG. 5, a charge pump 62 is also provided which is driven via the output shaft 28. Said charge pump 62 can be used to set the pretension pressure in the closed hydraulic circuit or to provide a control pressure for actuating the control elements (not shown) of the system.

Figure 6:
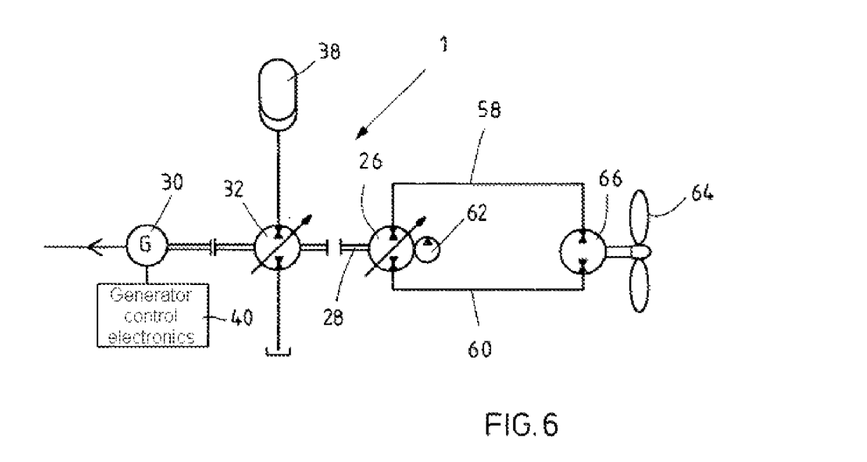
FIG. 6 shows an alternative embodiment to the converter according to FIG. 5.

FIG. 6 shows one exemplary embodiment of a converter 1 which can be used in a wind power plant or any other plant which utilizes a fluid flow. Here, a wind turbine 64 drives a hydraulic machine 66 which is configured with a constant delivery/displacement volume directly in a manner which is known per se, which hydraulic machine 66 is connected in a closed circuit to the second hydraulic machine 26 in the above-described way. When the wind turbine 64 is driven, the constant hydraulic machine 66 acts as a pump, as in the above-described exemplary embodiments, and drives the second hydraulic machine 26. A charge pump 62 can once again be provided in order to load the closed hydraulic circuit with pressure. With regard to the generator 30, the hydraulic machine 32 and the hydraulic accumulator, the exemplary embodiment corresponds to that according to FIG. 5, with the result that further explanations can be omitted.

In the exemplary embodiment according to FIG. 6, a hydrostatic gear mechanism is realized by way of the two hydraulic machines 26 and 66 which are connected hydraulically to one another. A hydraulic machine 32 and a hydraulic accumulator 38 can then also be used in the way which is shown in FIGS. 5 and 6 when a mechanical gear mechanism is provided instead of the hydrostatic gear mechanism. Here, the hydraulic machine can be inserted, as in FIGS. 5 and 6, into the mechanical connection between an output shaft 28 of the mechanical gear mechanism and the generator 30 or else can be seated at an auxiliary output of the mechanical gear mechanism.

Figure 7:
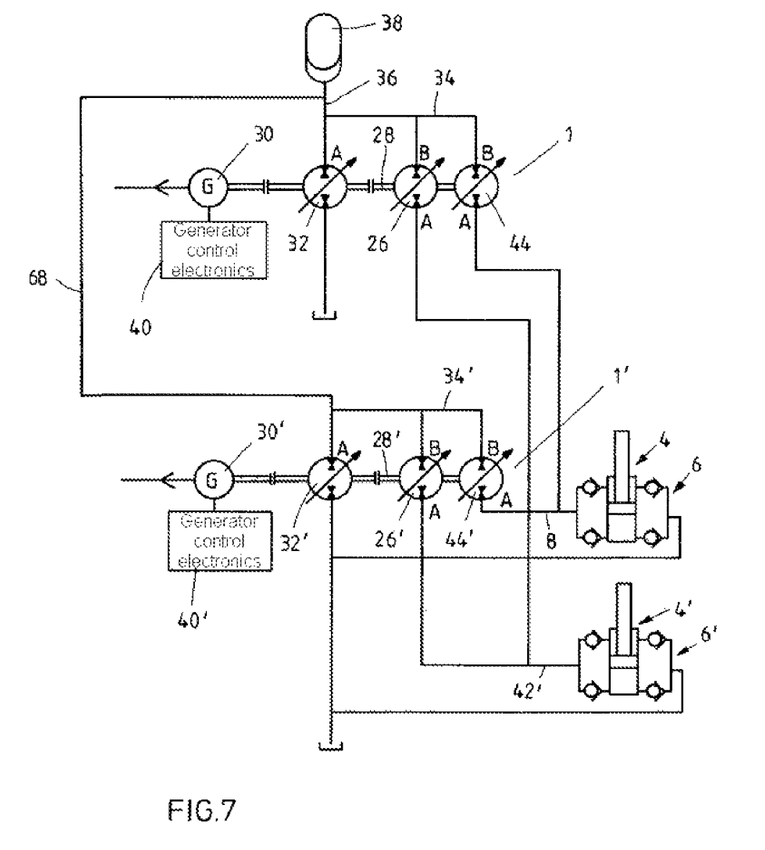
FIG. 7 shows a converter arrangement with two converters similar to the embodiment in FIG. 3.

FIG. 7 shows a converter arrangement, in which two of the above-described converters 1, 1' are together assigned to one hydraulic accumulator unit 38. In a similar manner to that in the exemplary embodiment according to FIG. 3, each converter 1, 1' is configured with three adjustable hydraulic machines 32, 26, 44 and 32', 26', 44', respectively, which are operatively connected via a common output shaft 28, 28' to the associated generator 30, 30'. The pressure side of the pump 4 is connected via the pressure line 8 firstly to the connection A of the third hydraulic machine 44' and secondly to the connection A of the hydraulic machine 44 of the converter 1. In a corresponding way, the pressure line 42 of the pump 4' is connected to the connections A of the second hydraulic machine 26, 26' of the converters 1, 1'; in other words, the respective pressure lines 8, 42 branch to the inlet connections of the second and third hydraulic machine 26, 44, 26', 44'. The further connections B of the hydraulic machines 26, 44 and 26', 44' are then connected in each case to the associated inflow line 34, 34' of the converter 1 and 1', in accordance with the above-described exemplary embodiments. As in the exemplary embodiments according to FIGS. 1 and 3, the accumulator line 36 branches off from the inflow line 34 of the converter 1, which inflow line 34 is connected to the connection A of the first hydraulic machine 32, to which accumulator line 36 the hydraulic accumulator unit 38 is connected. In a corresponding way, an accumulator connecting line 68 branches off from the inflow line 34' of the converter 1', which accumulator connecting line 68 opens into the accumulator line 36, with the result that the hydraulic accumulator unit 38 is in a pressure medium connection with the connections A of the first hydraulic machines 32, 32' and the connections B of the second hydraulic machines 26, 44, 26', 44'. Via the control units 40, 40' or a common control unit 40, the pivot angles of said hydraulic machines 32, 26, 44, 32', 26', 44' are then set analogously to the above-described procedure in such a way that a substantially constant electrical power output is tapped off at the respective generator 30, 30', a corresponding damping pressure being set in the pressure lines 8, 42.

It goes without saying that the converter arrangement according to FIG. 7 can also be configured with more than two converters.

In principle, the variants according to FIGS. 1 to 6 can also be transferred to a converter arrangement according to FIG. 7.

A hydroelectric converter, a converter arrangement having a plurality of converters of this type, and a method for actuating a hydroelectric converter are disclosed, in which two adjustable hydraulic machines of each converter are actuated in such a way that a predefined damping pressure is set in a pressure line of a pump of a PTO depending on the mechanical power which is introduced into the PTO.

The invention claimed is:

1. A hydraulic converter comprising:
   a first hydraulic machine configured to drive an electric machine;
   a power take-off ("PTO") driven by a natural force, the PTO having a pump assigned to a hydraulic accumulator unit and operatively connected to the first hydraulic machine; and
   a second hydraulic machine configured to drive the electric machine, the delivery/displacement volumes of the two hydraulic machines being configured to be adjusted so as to homogenize a tapped-off electrical power at the electrical machine,
   wherein both of the hydraulic machines are connected in series hydraulically, the second hydraulic machine being arranged upstream and the hydraulic accumulator unit being loaded with the pressure between the first hydraulic machine and the second hydraulic machine.

2. The converter as claimed in claim 1, wherein a connection of the first hydraulic machine is connected to a tank or low pressure.

3. The converter as claimed in claim 1, further comprising a further PTO assigned a third hydraulic machine, the third hydraulic machine being operatively connected to the electric machine and connected hydraulically in parallel to the second hydraulic machine, wherein connections of the second hydraulic machine and the third hydraulic machine are connected to a connection of the first hydraulic machine.

4. The converter as claimed in claim 1, wherein the PTO is wave-operated or wind-operated.

5. The converter as claimed in claim 1, wherein the hydraulic accumulator unit includes a plurality of hydraulic accumulators connected in parallel.

6. The converter as claimed in claim 1, wherein the electric machine is configured as a generator.

7. A hydraulic converter comprising:
   a first hydraulic machine configured to drive an electric machine;
   a power take-off ("PTO") driven by a natural force, the PTO having a pump assigned to a hydraulic accumulator unit and operatively connected to the first hydraulic machine; and
   a second hydraulic machine configured to drive the electric machine, the delivery/displacement volumes of the two hydraulic machines being configured to be adjusted so as to homogenize a tapped-off electrical power at the electric machine, wherein:
      the first hydraulic machine and the electric machine form a first motor/generator unit, and
      the converter further comprises a second motor/generator unit including an additional electric machine and a third hydraulic machine configured to be driven via the hydraulic accumulator unit.

8. The converter as claimed in claim 7, wherein at least the second hydraulic machine is arranged in a hydraulically closed circuit.

9. The converter as claimed in claim 8, further comprising a charge pump configured to be driven by the hydraulic machines.

10. A converter arrangement comprising:
    a hydraulic accumulator unit; and
    a plurality of converters, each converter of the plurality of converters including:
      an electric machine;
      a first hydraulic machine configured to drive the electric machine;
      a power take-off ("PTO") driven by a natural force, the PTO having a pump and operatively connected to the first hydraulic machine;
      a second hydraulic machine configured to drive the electric machine and to charge the hydraulic accumulator unit,
    wherein delivery/displacement volumes of the first and second hydraulic machines of each of the plurality of converters are adjusted so as to homogenize a tapped-off electrical power at the electric machine, and
    wherein the hydraulic accumulator unit is assigned to each of the plurality of converters.

11. The converter arrangement as claimed in claim 10, wherein the second hydraulic machine of at least one of the plurality of converts is arranged in a hydraulically closed circuit.

12. A method for actuating a hydroelectric converter, including a power take-off ("PTO") driven by a natural force, the PTO having a pump assigned to a hydraulic accumulator unit and operatively connected to a first hydraulic machine, the first hydraulic machine being configured to drive an electric machine, the hydroelectric converter further including a second hydraulic machine configured to drive the electric machine, the method comprising:
    adjusting the delivery/displacement volume of the two adjustable hydraulic machines depending on the power which is input into the PTO in such a way that substantially constant power output is configured to be tapped off at the electric machine;
    determining an instantaneous volumetric flow at the an outlet of the pump;
    calculating the delivery/displacement volume of the first hydraulic machine;
    determining a corresponding required damping pressure at the outlet of the pump;
    determining a pressure in the hydraulic accumulator unit;
    calculating a required torque from the delivery/displacement volume, a pressure difference between tank pressure and damping pressure;
    determining a required power output of the electric machine; and
    adjusting the delivery/displacement volume of the second hydraulic machine until the desired power output is set at the electric machine.

13. The method as claimed in claim 12, wherein the electric machine is configured as a generator.

* * * * *

UNITED STATES PATENT AND TRADEMARK OFFICE
CERTIFICATE OF CORRECTION

| | | |
|---|---|---|
| PATENT NO. | : 9,467,022 B2 | Page 1 of 1 |
| APPLICATION NO. | : 14/110408 | |
| DATED | : October 11, 2016 | |
| INVENTOR(S) | : Louis Verdegem | |

It is certified that error appears in the above-identified patent and that said Letters Patent is hereby corrected as shown below:

In the Claims

In Column 10, Lines 28-31, Lines 1-4 of Claim 11 should read:

11. The converter arrangement as claimed in claim 10, wherein the second hydraulic machine of at least one of the plurality of converters is arranged in a hydraulically closed circuit.

In Column 10, Lines 45-46, Lines 14-15 of Claim 12 should read:

determining an instantaneous volumetric flow at an
    outlet of the pump;

Signed and Sealed this
Tenth Day of January, 2017

Michelle K. Lee
*Director of the United States Patent and Trademark Office*